United States Patent [19]

Senoo et al.

[11] Patent Number: 4,564,777
[45] Date of Patent: Jan. 14, 1986

[54] REINFORCED PERMANENT MAGNET ROTOR WITH CAST ZINC

[75] Inventors: Masaharu Senoo, Narashino; Keizi Noma, Funabashi; Akira Saruta, Chiba; Masanori Yoshizaki, Yachiyo; Koichi Teshirogi, Narashino; Kouei Yaegashi, Funabashi, all of Japan

[73] Assignee: Hitachi, Ltd., Tokyo, Japan

[21] Appl. No.: 603,430

[22] Filed: Apr. 24, 1984

[30] Foreign Application Priority Data

Apr. 27, 1983 [JP] Japan ................... 58-72832
Mar. 2, 1984 [JP] Japan ................... 59-38509

[51] Int. Cl.⁴ .......................................... H02K 21/12
[52] U.S. Cl. .................................. 310/156; 310/262; 310/264; 310/211
[58] Field of Search ............... 310/156, 261, 262, 264, 310/265, 81, DIG. 1, 211, 212

[56] References Cited

U.S. PATENT DOCUMENTS

| 3,154,705 | 10/1964 | Essenburg | 310/211 X |
| 3,330,031 | 7/1967 | Rediger et al. | 310/211 X |
| 4,139,790 | 2/1979 | Steen | 310/156 |
| 4,144,469 | 3/1979 | Miyashita et al. | 310/156 |
| 4,158,225 | 6/1979 | Hertz | 310/211 X |
| 4,309,635 | 1/1982 | Sei | 310/211 |
| 4,403,161 | 9/1983 | Miyashita et al. | 310/156 |
| 4,454,438 | 6/1984 | Yamashita et al. | 310/156 X |

Primary Examiner—Mark O. Budd
Attorney, Agent, or Firm—Antonelli, Terry & Wands

[57] ABSTRACT

A novel rotor construction is disclosed, in which plural permanent magnets are arranged on the outer periphery of a rotor core, which are protected with a cover, and in which a member is placed at an axial end of the rotor core cast with end rings with a balance weight on the outside thereof. The protective cover protects the outer peripheries of the end rings and dampens the centrifugal force of the balance weight. Projections provided on the outer periphery of the member are located at the center of the permanent magnets to reduce the leakage magnetic fluxes between the permanent magnets.

9 Claims, 8 Drawing Figures

REINFORCED PERMANENT MAGNET ROTOR WITH CAST ZINC

BACKGROUND OF THE INVENTION

1. Field of the Invention

This invention relates to a rotor with permanent magnets of a rotating machine, or more in particular to a rotor in which a rotor core is integrally formed with permanent magnets arranged on the outer periphery thereof by means of molten metal.

2. Description of the Prior Art

Generally, a ferrite magnet which is superior in magnetic characteristics and low in cost is widely used as a permanent magnet in a rotor. This ferrite magnet, however, is hard and fragile, low in dimensional accuracy, and difficult to process.

In an assembly comprising such a permanent magnet as this arranged around the periphery of a rotor core and bonded thereto by a bonding agent, the permanent magnet is liable to be separated or even flown away from the rotor core, especially when the rotor is driven at high speed. In order to obviate this disadvantage, a rotor in which the surface of the permanent magnets is covered with a protective cover is disclosed in Japanese Patent Laid-Open No. 166755/81 by Takashi Seshita and Hideo Uzuhashi.

Such a proposed rotor is used on an enclosed-type power compressor by being fixed at an end of the rotary shaft coupled to a compression mechanism. This rotor comprises plural permanent magnets arranged along the outer periphery of the rotor core, and the outer peripheries of the permanent magnets are covered with a protective cover, with side covers applied to the upper and lower sides thereof.

A balance weight for correcting the unbalance weight of the compression mechanism is fixed on the outer surface of the side cover. This balance weight is usually fixed on the side cover by welding, screwing or caulking.

When a synchronous motor with such a rotor built therein is driven at high speed, the balance weight develops a great centrifugal force. When this centrifugal force exceeds the fastening force between the balance weight and the side cover, the balance weight is separated from the side cover and flies away to damage the stator coil, causing a fault of the synchronous motor.

The fastening of the balance weight to the protective cover by welding, screwing or caulking depends on working conditions and is not very reliable. In addition, the fastening work takes a long time.

SUMMARY OF THE INVENTION

Accordingly, an object of the present invention is to provide a rotor with permanent magnets, which are very reliable in strength.

Another object of the present invention is to provide a rotor with permanent magnets of high utility rate magnetic fluxes using a member of magnetic material.

Other objects of the present invention and effects attendant upon the objects will be easily understood from the following explanations.

According to the present invention there are positioned plural permanent magnets around the outer periphery of a cylindrical rotor core, and the outer peripheries of these permanent magnets are covered with a protective cover. The rotor core is provided with an axial through hole, and a connecting rod filled in this through hole and end rings positioned on both ends of the rotor core are cast by molten metal of the same material to be integrally formed. The end rings include a balance weight. The protective cover extends in the axial direction from the end of the permanent magnet and covers at least a portion of the outer periphery of the end rings.

When the rotor core is rotated by operation, a centrifugal force generated at the balance weight operates on the connecting part of the end rings and a connecting rod as peeling force. However, as the outer peripheries of the end rings are covered by the protective cover, the peeling force operating on the connecting part is controlled. Accordingly, the rotor with high strength can be obtained.

Furthermore, according to the present invention, a member is arranged at an axial end of a rotor core and is provided on the outer periphery thereof with plural projections for restricting the axial movement of the permanent magnets, which projections are located at one end of the permanent magnets at the circumferential center thereof. In this rotor with the projections at the center of the permanent magnets, the magnetic fluxes leaking between adjacent permanent magnets are dampened even if the member is formed of magnetic material. Also, the molten metal smoothly flows in the gap between adjacent permanent magnets thereby to securely fix the permanent magnets to each other in the rotor.

According to another aspect of the present invention, plural permanent magnets are arranged along the outer periphery of the rotor core and are provided with a protective cover along the outer periphery thereof to cast them integrally with molten metal, the protective cover being formed with a notch or an aperture. In the rotor of this construction, even when the coefficient of thermal expansion is different between the protective cover and the rotor core or the permanent magnets or the molten metal, the molten metal filled in the notch or the aperture of the protective cover prevents the protective cover from slipping.

DESCRIPTION OF THE PREFERRED EMBODIMENTS

Figure 2:
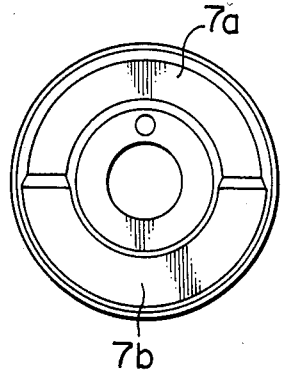
FIG. 2 is a side view of a rotor with permanent magnets shown in FIG. 1.
Figure 3:
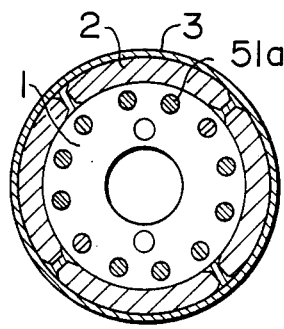
FIG. 3 is a sectional view taken in the line III—III in FIG. 1.

An embodiment of the present invention will be described in detail with reference to FIGS. 1 to 3.

Figure 1:
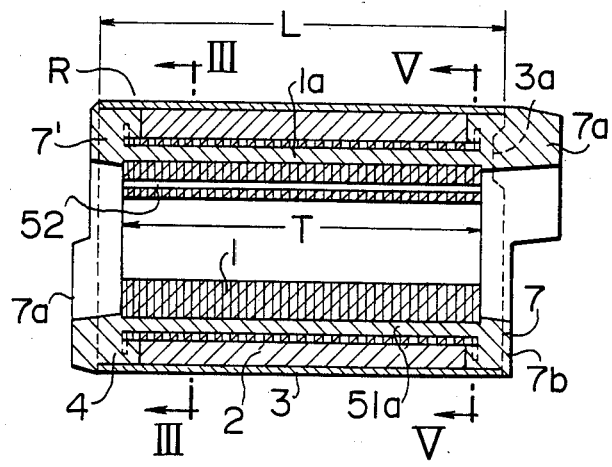
FIG. 1 is a sectional view of a rotor with permanent magnets according to the present invention.

A rotor R shown in FIG. 1 is provided with four permanent magnets 2 on the outer periphery of the cylindrical core thereof, and a protective cover 3 is arranged on the outer peripheries of the permanent magnets 2. The rotor core 1 has an axial through hole 1a filled with molten metal to form a connecting rod 51a. On both sides of the rotor core 1, there are provided end rings 7, 7' which are cast with the connecting rod 51a by the same molten metal. The end rings 7, 7', as shown by the side view of FIG. 2, include a balance weight 7a of circumferentially large volume and a portion 7b of circumferentially small volume forming an unbalance weight.

In the rotor R having the permanent magnets 2, the cylinder length L of the protective cover 3 is longer than the axial length T of the rotor core 1 and the end of the protective cover 3 covers the outer periphery of the end rings 7, 7'.

Now, consider the case where the rotor R having such permanent magnets is built in a synchronous motor and operated.

The balance weight 7a develops a centrifugal force expressed as $$F = Mr\omega^2 \qquad (1)$$

where F is the centrifugal force in kg; M the mass in kg; r the distance from center of rotation of the center of gravity in m; and $\omega$ the angular velocity in radians.

Assuming that the balance weight 7a formed at the end ring 7 weighs 124 gr, the distance between the center of gravity of the balance weight 7a and the center of rotation is 16 mm, and the rotational speed of the rotor R is 6000 rpm, the centrifugal force F is given by the following equation (2):

$$F = \frac{124 \times 10^{-3}}{9.8} \times 16 \times 10^{-3} \times \left(2\pi \frac{6000^2}{60}\right) \approx 80 \text{ (kg)} \qquad (2)$$

This centrifugal force of 80 kg makes up a load to separate radially outward the end ring 7 formed integrally on the balance weight 7a. This load is supported by the connecting rod 51a passed through the rotor core 1 and the protective cover 3 over the outer periphery of the end ring 7.

As compared with the case when the load due to the centrifugal force F is supported only by the connecting rod 51a, therefore, the stress of the connecting rod 51a is reduced thereby to improve the mechanical strength of the rotor R. On the other hand, since the balance weight 7a is formed integrally with the end ring 7 by the molten metal of the same material, the workability is improved and variations in working conditions are reduced, thus improving the reliability. Further, the fact that permanent magnets 2 are covered by an axially-extending protective cover 3 prevents the permanent magnets 2 from being damaged in transportation or handling thereof before casting or in the mounting work on the cast.

Now, explanation will be made of the molten metal used with the rotor R having the permanent magnets 2. The molten metal may be any one of aluminum, aluminum alloy, zinc or zinc alloy.

Aluminum or aluminum alloy has a superior casting characteristic and is a good conductor, and therefore is generally used as a secondary conductor for the rotor R. The rotor R with the permanent magnets 2 according to the present embodiment, however, does not require any secondary conductor. In other words, the rotor R which does not require any starting winding may be formed of molten metal of zinc or zinc alloy, which is higher in specific resistance and lower in melting point than aluminum or aluminum alloy. By use of the molten metal of zinc or zinc alloy filled in the through hole 1a or the gap 10 between adjacent permanent magnets 2, therefore, the high frequency current which otherwise might be induced by the armature winding is dampened. At the same time, the melting of zinc or zinc alloy with smaller heat amount saves electric power. Further, a protective cover 3 of aluminum material lower in heat resistance than stainless steel may be used.

The protective cover 3 may be formed of such non-magnetic material as stainless steel, aluminum or plastics. The stainless steel is higher in heat resistance and strength than aluminum or plastics, and therefore higher in melting point than the molten metal, thus capable of protecting the permanent magnets 2 better.

If non-conductive plastics high in insulation characteristic is used as the protective cover 3, an eddy current is not caused by the magnetic fluxes of the armature winding. As a result, no eddy current loss is caused in the protective cover 3, thus producing a rotating electric machine high in efficiency.

Figure 4:
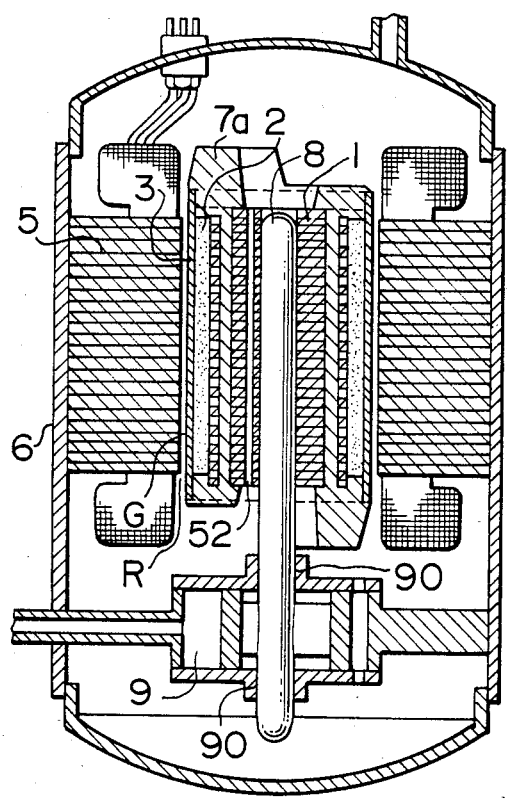
FIG. 4 is a sectional view of an enclosed-type compressor having a rotor built therein with permanent magnets.

The rotor of this type with permanent magnets 2 may be used built in an enclosed-type compressor as shown in FIG. 4.

Explanation will be made in more detail with reference to FIG. 4. A chamber 6 forming a housing includes fixed inside thereof a stator core 5 with armature winding. Inside of this stator core 5, there is a rotor R mentioned in the above embodiment with outer peripheries opposed through the gap G. This rotor R is fixed at one end of the shaft 8, the other end of which is connected with a compressor 9 providing a load of the motor and is supported by the bearing 90.

This compressor 9 has an unbalance weight with respect to the center of the shaft 8. The unbalance weight of the compressor 9 is balanced with a balance weight 7a on the end ring 7 of the rotor R.

Figure 5:
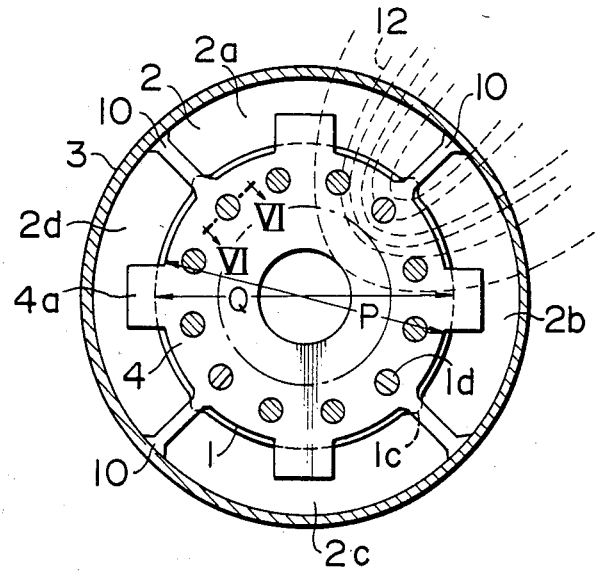
FIG. 5 is a sectional view taken in the line V—V in FIG. 1 showing a rotor with permanent magnets of another embodiment of the present invention.

Another embodiment of the present invention will be explained with reference to FIGS. 1 and 5. FIG. 5 is a sectional view taken in line V—V in FIG. 1. Four permanent magnets 2a, 2b, 2c, 2d are arranged on the outer periphery of the rotor core 1, and a member 4 such as a plate is arranged at an axial end of the rotor core 1. This member 4 has peripheral projections 4a to control the motion of the permanent magnets 2. Each projection 4a is located at the axial end of the permanent magnets 2 at the center of the circumference thereof.

A protective cover 3 of nonmagnetic material is arranged on the outer peripheries of the permanent magnets 2.

The molten metal is filled in the through hole 1a formed in the rotor core 1 to form a connecting rod 51a while at the same time forming an end ring 7 outside of the member 4.

In the rotor R of this construction, the magnetic lines of force 12 flow along the dashed lines in FIG. 5 between adjacent permanent magnets 2a and 2b.

The outer diameter P other than the projection 4a of the member 4 is formed equal to or smaller than the outer diameter Q of the rotor core 1. The projection 4a is not provided in the gap 10 between adjacent permanent magnets 2. It is therefore possible to dampen the leakage magnetic fluxes between the permanent magnets 2 by use of such magnetic material as electromagnetic steel plate or cold-rolled steel plate identical to that of the rotor core 1 for the member 4. The magnetic material, of which has member 4 may be formed, is easily available and high in utility.

Further, in view of the fact that the gap 10 between the adjacent permanent magnets 2 is not blocked axially by the member 4, the molten metal may be filled smoothly in the gap 10. Furthermore, the molten metal, while being casted, flows in two parts through the through hole 1a and the gap 10 from one end ring 7 to the other end ring 7', so that no blowholes are developed in the end ring 7', thus improving the mechanical strength and reliability thereof. Also, since the end rings 7, 7' are connected by the molten metal filled in the through hole 1a and the gap 10, the area of the connection is increased for an improved mechanical strength.

For the same mechanical strength, the through hole 1a of the rotor core 1 may be reduced in sectional area, thus making it possible to reduce the magnetic reluctance of the rotor core 1, leading to an improved characteristic of the rotating machine.

Still another embodiment of the present invention is characterized by a notch 3a at the end of the protective cover 3 as shown in FIG. 1. The protective cover 3 with this notch 3a is arranged on the outer periphery of permanent magnets 2 which are in turn arranged on the outer periphery of a rotor core 1, and cast integrally with such nonmagnetic material as aluminum, aluminum alloy, zinc or zinc alloy to form a rotor R. Since the protective cover 3 has the notch 3a filled with nonmagnetic material, the coefficient of thermal expansion of the protective cover 3 is higher than that of the rotor core 1 or the permanent magnets 2, so that an increased temperature of the rotor R in operation does not cause any slip of the protective cover 3. By the way, the notch 3a may be replaced by a hole.

Figure 6:
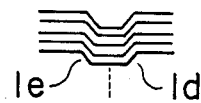
FIG. 6 is a partially enlarged sectional view of the embodiment taken in the line VI—VI in FIG. 5.

In a further embodiment of the present invention shown in FIG. 5, a rotor core 1 is made up of plural layers of iron plates, and a fixing portion of the iron plates 1d is arranged on the line connecting the gap 10 between adjacent permanent magnets 2 and the center of the rotor. The fixing portion 1d, as shown in FIG. 6, is provided with a projection 1e cut up from an iron plate, which projection 1e is fit into a recess of an adjacent iron plate. In this construction, the magnetic fluxes of the permanent magnets 2 flow along the dashed lines in the rotor core 1. Specifically, the magnetic flux density is highest at the portion of the rotor core 1 connecting the center of the rotor and adjacent permanent magnets 2, which portion is provided with a projection 1d higher in magnetic permeability than the through hole 1a contributing to an improved characteristic.

If the member 4 is fitted with the projections 1d securely, the relative mounting positions of the rotor core 1 and the member 4 are accurately determined, and the rotor core 1 and the permanent magnets 2 are controlled by the positioning projections 1c, with the result that the projections 4a on the member 4 can be positioned with higher accuracy at the center of the permanent magnets 2.

Figure 8:
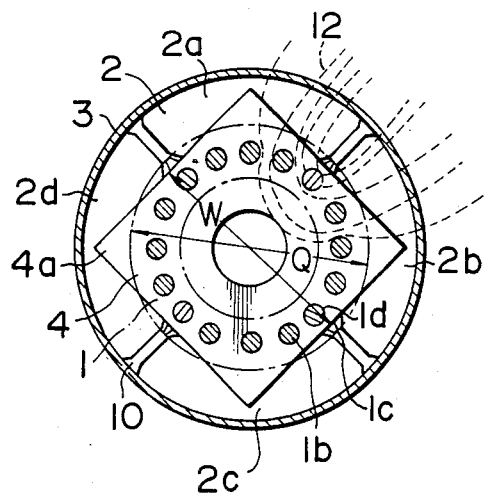
FIGS. 7 and 8 are sectional views or a rotor with permanent magnets according to a modification of the present invention.
Figure 7:
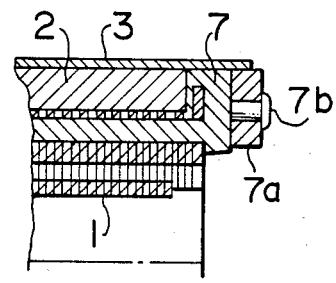

Various modifications of the present invention are of course available. For example, the balance weight 7a may be formed of a material different in specific gravity from the end ring 7 fixed after casting as shown in FIG. 7. On the other hand, the member 4 may have a rectangular outline as shown in FIG. 8. Now, it is desirable that the length W of one side of the member 4 is shorter than the diameter Q of the rotor core 1. Further, permanent magnets 2 may be provided in any other number than four.

Since certain changes may be made in the above apparatus and without departing from the scope of the invention herein involved, it is intended that all matters contained in the above descriptions or shown in the accompanying drawings shall be interpreted as illustrative and not in a limiting sense.

We claim:

1. A rotor comprising a cylindrical rotor core, plural permanent magnets arranged on the outer periphery of said rotor core, a protective cover on the outer periphery of said permanent magents, said rotor core including an axial through hole, and end rings which are positioned on both ends of said through hole of the rotor core and are integrally cast by molten metal of zinc said end rings including a balance weight, said protective cover covering at least a portion of the outer periphery of said end rings.

2. A rotor according to claim 1, wherein said molten metal fills said axial through hole of said rotor core so that said end rings are integrally cast with said rotor core.

3. A rotor core according to claim 2, wherein said end rings are formed integrally with said balance weight by said molten metal.

4. A rotor according to claim 1, wherein said protective cover of said permanent magnets is made of a selected one of stainless steel, aluminum and plastics.

5. A rotor according to claim 1, wherein said protective cover has a notch filled with said molten metal.

6. A rotor according to claim 1, wherein said end rings are formed integrally with said balance weight by said molten metal.

7. A rotor according to claim 1, wherein said cylindrical rotor core is made of layers of iron plates, and a member is arranged at an end of said rotor core, said end rings being located outside of said member, said iron plates and said member having plural projections cut out in the same direction, said projections being fitted to each other securely, said end rings being integrally cast by said molten metal filled in the through holes formed through said rotor core and said member, said projection being located on the line connecting a gap between adjacent permanent magnets and the center of said rotor.

8. A rotor comprising a cylindrical rotor core, plural permanent magnets arranged on the outer periphery of said rotor core, a protective cover on the outer periphery of said permanent magnets, said rotor core including at least one axial through hole, and end rings which are positioned on both ends of said at least one axial through hole of said rotor core and are integrally cast by molten metal, said molten metal filling said at least one axial through hole of said rotor core so that said end rings are integrally cast with said rotor core, said molten metal being zinc.

9. A rotor comprising a cylindrical rotor core, plural permanent magnets arranged on the outer periphery of said rotor core, a protective cover on the outer periphery of said permanent magnets, said rotor core including at least one axial through hole, and end rings which are positioned on both ends of said through hole of said rotor core and are integrally cast by molten metal of zinc, said end rings including a balance weight formed integrally therewith by said molten metal.

* * * * *